United States Patent
Aganze (10) Patent No.: US 10,003,564 B1
(45) Date of Patent: Jun. 19, 2018

(54) SOCIAL NETWORKING MEDIA SYSTEM AND APPLICATION

(71) Applicant: Joie Assani Aganze, Arlington, TX (US)

(72) Inventor: Joie Assani Aganze, Arlington, TX (US)

( * ) Notice: Subject to any disclaimer, the term of this patent is extended or adjusted under 35 U.S.C. 154(b) by 0 days. days.

(21) Appl. No.: 15/458,769

(22) Filed: Mar. 14, 2017

(51) Int. Cl.
| | |
|---|---|
| G06F 15/16 | (2006.01) |
| H04L 12/58 | (2006.01) |
| G07F 17/32 | (2006.01) |
| G06Q 50/00 | (2012.01) |
| G06Q 50/34 | (2012.01) |
| G06Q 30/02 | (2012.01) |

(52) U.S. Cl.
CPC ......... *H04L 51/32* (2013.01); *G06Q 30/0209* (2013.01); *G06Q 50/01* (2013.01); *G06Q 50/34* (2013.01); *G07F 17/3223* (2013.01); *G07F 17/3239* (2013.01); *G07F 17/3276* (2013.01); *G07F 17/3288* (2013.01)

(58) Field of Classification Search
CPC ........ H04L 51/32; G06Q 50/01; G06Q 50/34; G06Q 30/0209; G06F 17/30861–17/30876; G07F 17/3288; G07F 17/3237–17/3239; G07F 17/3276–17/3281
See application file for complete search history.

(56) References Cited

U.S. PATENT DOCUMENTS

| | | | |
|---|---|---|---|
| 2010/0287050 A1* | 11/2010 | Jones | G06Q 30/02 705/14.58 |
| 2010/0299325 A1* | 11/2010 | Tzvi | G06F 17/30873 707/728 |
| 2012/0023390 A1* | 1/2012 | Howes | G06F 17/30864 715/205 |
| 2012/0102420 A1* | 4/2012 | Fukahori | G06Q 10/107 715/771 |
| 2012/0117059 A1* | 5/2012 | Bailey | G06F 17/30867 707/723 |
| 2013/0030905 A1* | 1/2013 | Fuloria | G06Q 50/01 705/14.39 |
| 2013/0054699 A1* | 2/2013 | MacAskill | G06Q 50/01 709/204 |

(Continued)

*Primary Examiner* — Brendan Higa
(74) *Attorney, Agent, or Firm* — Law Office of Jeff Williams; J. Oliver Williams (57) ABSTRACT

A system and method of regulating the display of digital content media in a social media platform is described. The method includes processing digital content media via one or more processors. The processors are in communication with an input/output interface and a database. Each item of digital content media is associated with a particular user and stored in a database. The system displays the digital content media within a media feed through the input/output interface in accordance to the preferences of each user. Command data is received and processed for each user. The system automatically allocates the placement of the digital content media according to a defined point value. Each digital content media is assigned a point value by the posting user which is automatically ranked by the system in accordance with the assigned point value. The system updates the media feed to reflect new and modified point values.

19 Claims, 5 Drawing Sheets

(56) References Cited

U.S. PATENT DOCUMENTS

| | | | | |
|---|---|---|---|---|
| 2013/0246521 A1* | 9/2013 | Schacht | ................. | G06Q 50/01 |
| | | | | 709/204 |
| 2013/0262476 A1* | 10/2013 | Barak | ............... | G06F 17/30905 |
| | | | | 707/748 |
| 2013/0332523 A1* | 12/2013 | Luu | .................... | G06Q 30/0251 |
| | | | | 709/204 |
| 2014/0059447 A1* | 2/2014 | Berk | ....................... | G06Q 10/10 |
| | | | | 715/751 |
| 2014/0146052 A1* | 5/2014 | Takamura | ............... | G06F 13/00 |
| | | | | 345/440 |
| 2014/0172877 A1* | 6/2014 | Rubinstein | ........ | G06F 17/30867 |
| | | | | 707/748 |
| 2014/0278356 A1* | 9/2014 | Anglin | ................ | G06F 17/2785 |
| | | | | 704/9 |
| 2014/0344039 A1* | 11/2014 | Kowalczyk | ............ | G06Q 50/01 |
| | | | | 705/14.19 |
| 2015/0106446 A1* | 4/2015 | Brophy | ................. | G06Q 50/01 |
| | | | | 709/204 |
| 2015/0213022 A1* | 7/2015 | Agarwal | ............ | G06F 17/3053 |
| | | | | 707/731 |
| 2015/0213119 A1* | 7/2015 | Agarwal | ................ | G06Q 10/10 |
| | | | | 707/737 |

* cited by examiner

SOCIAL NETWORKING MEDIA SYSTEM AND APPLICATION

BACKGROUND

1. Field of the Invention

The present application relates to an improvement on existing electronic media applications, and more particularly to an application that improves a method and manner of advertising wherein placement of information is based upon a degree of social interaction. Additionally, the application permits users to compete with one another through social media content.

2. Description of Related Art

Social media is a common tool or part of society. Most people in society engage in some form of social media each day. Common social media providers are Facebook ®, LinkedIN ®, Twitter ®, and more. Content may be seen via pictures, comments, quotes, text, games, and so forth. It is common for people to engage directly in some form of this social media. An alternate method of engagement is through indirect methods where the individual comes across the media content potentially without entering the provider's online applications. An effort to use social media to its fullest extent has ushered in the area of advertising within social media to try and capture business.

Typically advertising in all forms requires an individual, who wishes to place an advertisement, to pay an amount of money for a particular space (printed or digital medium) or time (i.e. radio) to run the advertisement. Often with advertising, the payment amount dictates the position of the advertisement. Although capitalistic in nature and for the most part being generally considered acceptable, the accessibility of advertisement or general exposure is limited to those with money. Social media is geared to allow another method of interaction wherein advertising isn't tied to an individual's money, but is tied to his/her degree of social interaction.

Although strides in social media and advertising have been made, considerable shortcomings remain.

SUMMARY OF THE INVENTION

An object of the present application is to disclose a computer-implemented method of regulating the display of digital content media in a social media platform. The method may include a plurality of steps. The social media platform is configured to be used by a plurality of users for the display of digital content media. Each user is identified by providing specific and unique identification data through a digital portal. The computer processes the digital content media via one or more processors. The processors are in communication with an input/output interface and a database so as to selectively access and display pertinent digital content media. Each user is associated with unique identification data and digital content media. The computer selectively displays the digital content media within a media feed through the input/output interface in accordance to the preferences and selections of each user. The user may provide command data to the computer to perform a number of tasks.

One such task is that of assigning a point value to each piece of digital content media that a particular user placed into the social media platform. The computer is configured to allocate/rank the placement of the digital content media automatically in relation to the defined point value. Each digital media content is automatically ranked in accordance with the assigned point value and set to display in assorted media feeds based upon the point value and not upon the time of posting the digital content media.

The computer also provides each user a method for acquiring points. These points are stored and selectively used by the user to view particular content media, adjust the ranking or location of their digital content media in the media feed, and compete with other users in performance competitions. The computer is configured to track the performance of digital content media within a performance tracking module. Digital content media between one or more users are compared to set performance criteria. Point values may be wagered against the performance criteria.

Furthermore it is an object of the present application to disclose a method of interacting with digital media content in a social media platform wherein users may selectively view digital media through a media feed, interact with other users, post digital content media to the media feed, and acquire points to enable the user to take part in particular functions and features of the social media platform.

It is an object to the present application that the social media platform provide users the ability to enter competing media posts against one another wherein the winner of the competition is determined by satisfying selected performance criteria. The users may elect to select the particular criteria. Additionally, a wager of points may be placed upon the outcome of the competition.

An object of the present application is to provide users more functionality, features, and control over the content they provide within the social media platform. The platform uses points as a method of granting selected features and functionality. Points may be obtained, wagered, spent and saved as desired by each user.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

While the device and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The system and method in accordance with the present application overcomes one or more of the above-discussed problems commonly associated with traditional social media platforms. In particular, the system and method is configured to allow a user's social media influence to selectively determine their content placement within the application. Additionally, the application and device is configured to permit various methods of accumulating points, including social media content competitions between at least 2 separate parties. These and other unique features of the device are discussed below and illustrated in the accompanying drawings.

The system and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system and method of the present application is illustrated in the associated drawings. The device includes a software application and/or social media platform in communication with one or more electronic devices. The devices are configured to be linked through the World Wide Web via known communication methods. A plurality of users are permitted to engage socially with the sharing and viewing of social media content, interacting with games, and even linking content from various media platforms. Shared digital media content is ranked for viewing according to the posting user's social media influence and/or assigned point value. The time of posting is not a predominant criteria in placement of digital media within media feeds. Additional features and functions of the device are illustrated and discussed below.

Figure 1:
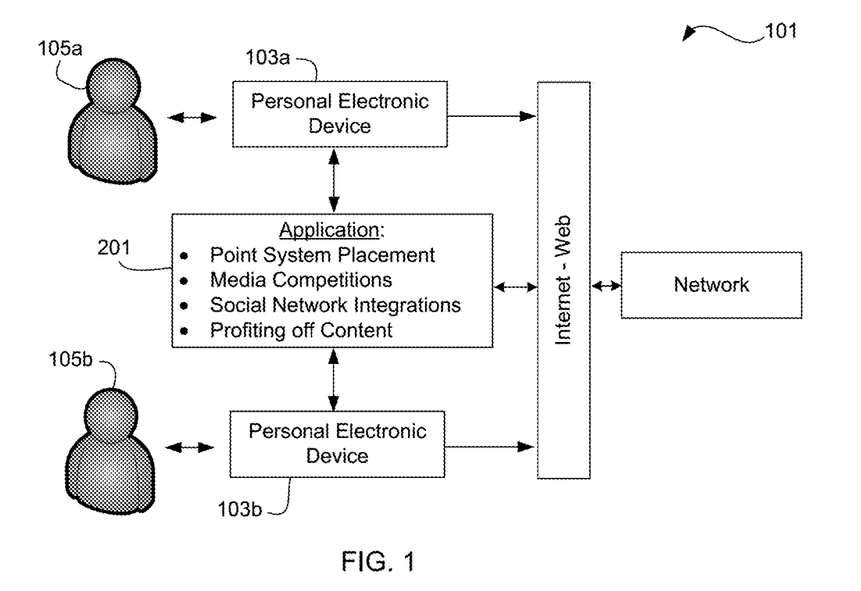
FIG. 1 is a flow chart of a system for regulating the display of digital media content according to an embodiment of the present application.

Referring now to the drawings wherein like reference characters identify corresponding or similar elements in form and function throughout the several views. FIG. 1 illustrates a system for the display and interaction of digital content media on a social media platform according to the present application. System 101 includes an electronic device 103 configured to provide and receive information from a user 105. Device 103 is configured to be operable through the World Wide Web and/or a network via all known communication methods. As depicted in FIG. 1, two devices 103 are illustrated, namely device 103a and device 103b. Each is an exemplary form of device 103. Each device is configured to process and operate an application that provides for the methods of interacting between users via a social media platform as herein described. The system is configured to work with multiple users, as depicted by users 105a and 105b.

Figure 2:
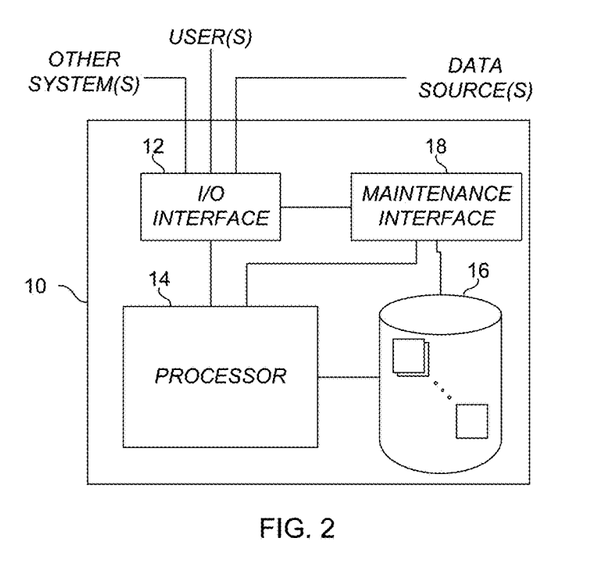
FIG. 2 is an exemplary embodiment of the system of FIG. 1.

Referring now to FIG. 2 in the drawings, an exemplary system 10 for operating the functions of a social media platform according to the methods herein described is illustrated. System 101 is configured to use device 103 so as to run or operate application 201 defining the social media platform of the present application. System 101 is configured to selectively rank digital content media according to its assigned point value as designated by the posting user. The point values of the content amongst a plurality of users are compared to one another and automatically ranked in accordance with the assigned point values in descending order. Each user may accumulate points through interaction within the social media platform and through their corresponding social media influence. The social media influence is obtained through system 101 through various methods described herein. Typically, the more influence a user has corresponds to the amount of points they have to use. As seen and described in FIG. 2 is an exemplary representation of system 101

The system 10 includes an input/output (I/O) interface 12, an optimization engine 14, a database 16, and a maintenance interface 18. Alternative embodiments can combine or distribute the input/output (I/O) interface 12, optimization engine 14, database 16, and maintenance interface 18 as desired. Embodiments of the system 10 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks. Furthermore the computers may use transitory and non-transitory forms of computer-readable media. Non-transitory computer-readable media is to be interpreted to comprise all computer-readable media, with the sole exception of being a transitory, propagating signal.

The I/O interface 12 provides a communication link between external users, systems, and data sources and components of the system 10. The I/O interface 12 can be configured for allowing one or more users to input information to the system 10 via any known input device. Examples can include a keyboard, mouse, touch screen, microphone, and/or any other desired input device. The I/O interface 12 can be configured for allowing one or more users to receive information output from the system 10 via any known output device. Examples can include a display monitor, a printer, a speaker, and/or any other desired output device. The I/O interface 12 can be configured for allowing other systems to communicate with the system 10. For example, the I/O interface 12 can allow one or more remote computer(s) to access information, input information, and/or remotely instruct the system 10 to perform one or more of the tasks described herein. The I/O interface 12 can be configured for allowing communication with one or more remote data sources. For example, the I/O interface 12 can allow one or more remote data source(s) to access information, input information, and/or remotely instruct the system 10 to perform one or more of the tasks described herein.

The database 16 provides persistent data storage for system 10. While the term "database" is primarily used, a memory or other suitable data storage arrangement may provide the functionality of the database 16. In alternative embodiments, the database 16 can be integral to or separate from the system 10 and can operate on one or more computers. The database 16 preferably provides non-volatile data storage for any information suitable to support the operation of the system 10, including various types of data discussed below in connection within the Figures described herein.

The maintenance interface 18 is configured to allow users to maintain desired operation of the system 10. In some embodiments, the maintenance interface 18 can be configured to allow for reviewing and/or revising the data stored in the database 16 and/or performing any suitable administrative tasks commonly associated with database management. This can include, for example, updating database management software, revising security settings, and/or performing data backup operations. In some embodiments, the maintenance interface 18 can be configured to allow for maintenance of the optimization engine 14 and/or the I/O interface 12. This can include, for example, software updates and/or administrative tasks such as security management and/or adjustment of certain tolerance settings.

The optimization engine 14 is configured permit the methods of regulating content and interacting with a social media platform as herein described. The optimization engine 14 can include various combinations of one or more processors, memories, and software components.

Figure 3:
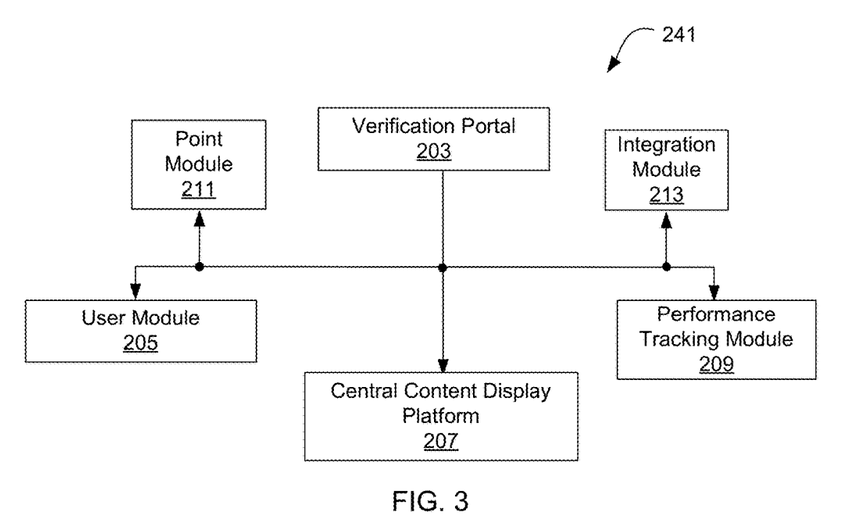
FIG. 3 is a chart of an application used in the system of FIG. 1.

Referring now also to FIG. 3 in the drawings, a chart 241 showing the application defining the social media platform is illustrated. Application 201 is operable via device 103 and is configured to include the following members: a verification portal 203, a user module 205, a central content display platform 207, a performance tracking module 209, a point module 211 and an integration module 213. Each member is configured to have the ability to communicate with each other member.

Figure 4:
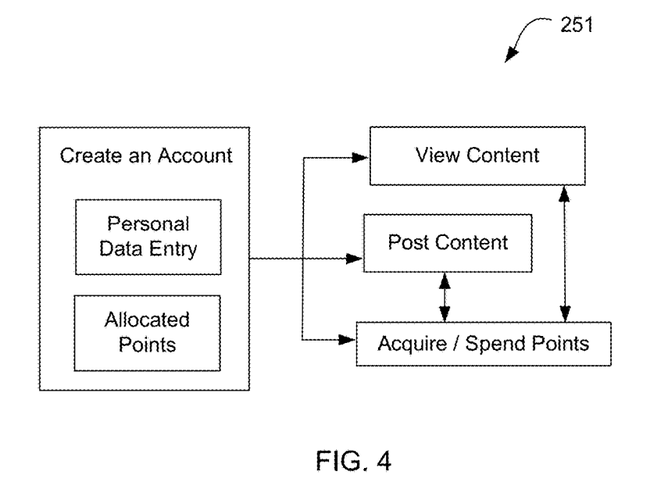
FIG. 4 is a chart of illustrating a manner of creating an account in the system of FIG. 1.

Verification portal 203 is configured to selectively authorize entrance into application 201. Portal 203 is configured to receive user identification data as a means of identifying a particular user. Each user of application 201 is assigned or selects unique identification data that is linked to their personal account. As seen in FIG. 4, a chart 251 showing that personal data (i.e. first name and last name) may be entered when creating an account is provided. This information is stored within a database in system 101. Provided identification data is compared to known existing users. New users are able to create an account via portal 203. Upon entry, a user is able to view content, post content, and acquire/spend points. Each user is granted an initial allocation of points upon registration through portal 203.

User module 205 is configured to selectively store and process information related to the particular user. This information may commonly be referred to as user profiles, settings, preferences, and personal content. Application 201 is configured to identify each user by an identifier. A user may elect to select a displayed identifier visible to other users. Information related to the user is stored within module 205. User preferences and settings may be adjusted by the user as needed. Examples of adjustable settings may relate to the display of information and security. Within application 201 a user may create one or more designated virtual spaces (i.e. rooms or pages) for the display of their personal information, digital content media posts, and so forth. Access may be governed by the user wherein the user may elect to make the space "private" (i.e. limiting access to only those granted access) or public (i.e. open to be viewed without the need of permission). As is common, access may further be defined by the type of relationship other users have in relation to this particular user. Another feature of application 201 is that the user may assign a "fee" to enter the space. This may be a one-time fee or set as a re-occurring fee for each entrance.

Application 201 permits each user the ability to collect points. Points may be referred to in different ways, such as credits, tokens, currency, and so forth. Points are exchanged or used by a user to obtain selected advantages, access features, and perform selected functions within application 201. As noted above, users may be assessed a "fee" of points to access a user's space. The more points one accrues, generally the more access and opportunity that user has to partake in the features and functions of application 201. By acquiring more points, a user is able to interact more fully with system 101.

Point module 211 is configured to monitor the accumulation and spending of points for each user. Module 211 may be accessed by user via any known member of application 201. Central content display platform 207 is configured to provide the underpinnings and structure necessary to display the digital content media for each user. Platform 207 may include a media feed which serves as a compilation of media content of a plurality of users. This media is sorted and arranged by system 101 according to preferences of the user and assigned point values by user who posted each piece of digital content media.

Integration module 213 is configured to permit the cross utilization of media from other applications. Integration module is configured to process and convert as necessary any data captured from another application that is linked or used in application 201. For example, a user may grab a link (i.e. a URL) from another application and insert that into the posting of a digital content media post in application 201. Captured data may take the form of videos, pictures, hyperlinks, audio files, and so forth. All types of data are considered acceptable. These links may be displayed directly through application 201 or more commonly, are treated as links themselves such that when clicked, take the viewer to the site where the link was obtained from. For example, if a user takes the URL from a YouTube® post and puts it into application 201, the link will be visible to users and when clicked, the viewer will be taken to YouTube® to view the link.

Performance tracking module 209 is configured to coordinate, monitor, and assess the performance of digital media content as compared to selected performance criteria. System 101 may analyze the performance of either digital media content on application 101 or the performance of digital media content posted to 3$^{rd}$ party sites where those posts were also linked in a digital media post in application 201. For example, going from the YouTube® example above, module 209 may track the performance of the YouTube® video on YouTube® and account for such performance in relation to the selected performance criteria established in system 101. Users are able to use module 209 to wager points against one another as to the performance of particular media posts. Further discussion will be had with module 209 in FIG. 8.

Figure 5:
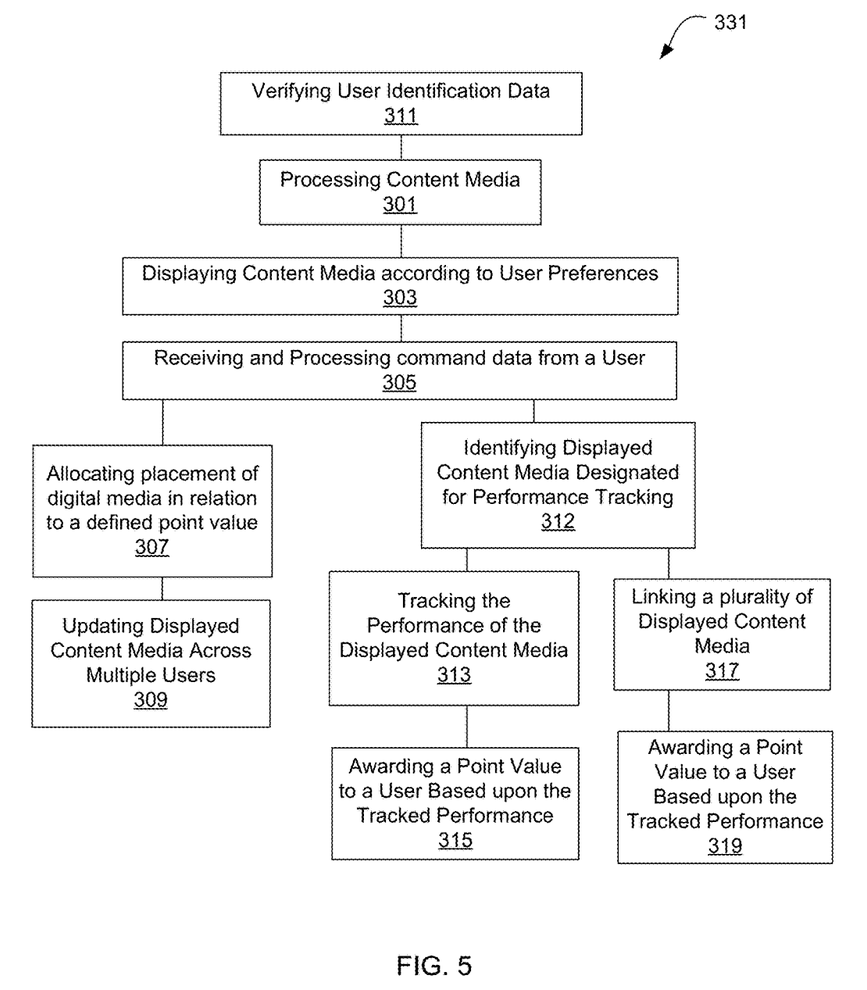
FIG. 5 is a chart of the method and functions of the system of FIG. 1.

Referring now also to FIG. 5 in the drawings, a chart 331 illustrating the computer-implemented method of regulating the display of digital content media is provided. System 101 is configured to provide a computer-implemented method of regulating the display of digital content media in a social media platform. This is performed through application 201. The method may include processing digital content media via one or more processors 301, displaying digital content media through a media feed 303, receiving and processing command data from a particular user 305, allocating/ranking the placement of digital content media automatically 307, and updating the media feed to reflect current conditions 309.

As noted previously, portal 203 is configured to selectively authorize entrance into application 201 for each user. The method may include verifying user identification data for each user 311. Each user is required to provide unique identification data to gain entrance. The system is configured to compare the provided information with known identification data on the database.

The step of processing digital content media (step 301) is performed by one or more processors. The processors are in communication with an input/output interface and a database. All content and user specific information is stored on one or more databases throughout system 101. Each item of digital content media is associated with a particular user.

The step of displaying digital content media through a media feed (step 303) is done according to set standard programming functions of application 201, user preferences, and the actions of other users. The actions of other users are permitted to influence the appearance of digital media content of every other user. Application 201 is designed to permit users to influence the location of digital media posts by assigning a particular point value to a post of digital media.

Figure 6:
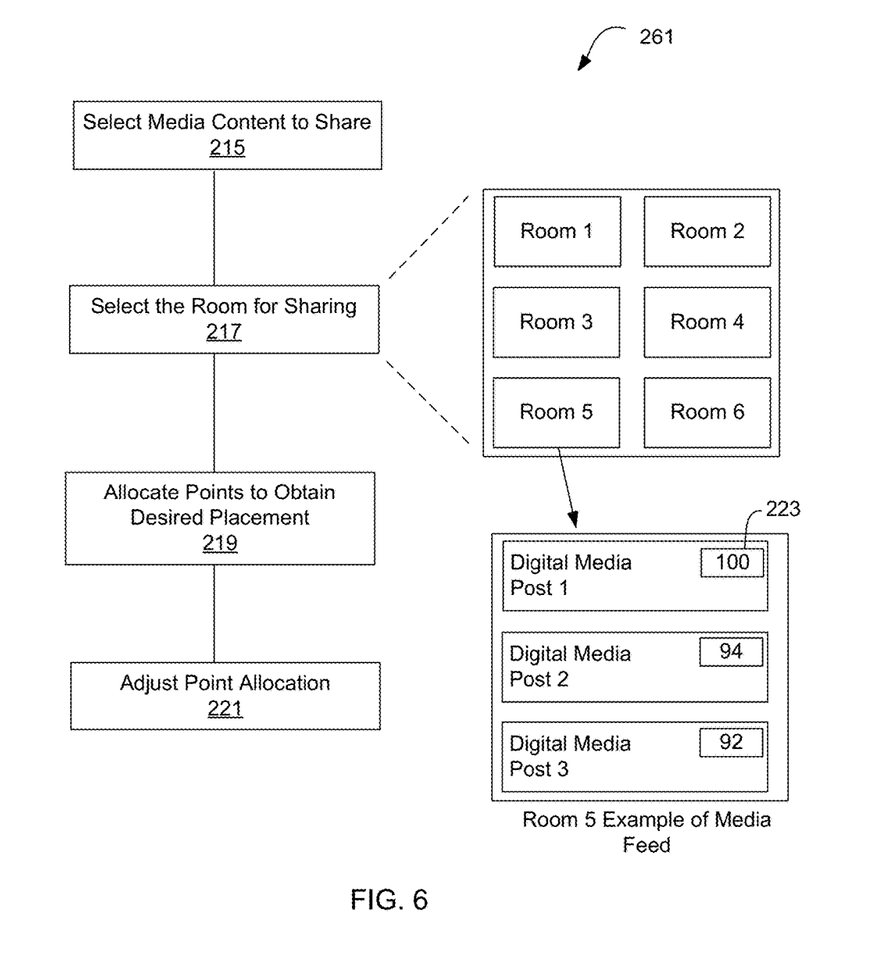
FIG. 6 is a chart of the method of posting digital media in the system of FIG. 1.

Referring now also to FIG. 6 in the drawings, a chart illustrating the process of posting digital media in application 201 is provided. Digital media may be viewed in different ways through platform 207. Application 201 permits for the classification of media posts into different categories or fields for display (i.e. Rooms 1-6). Each category serves to more uniformly define the topic or content of the digital content media posted to application 201. Exemplary categories may include: People, Cars/Mechanical, Clothes, Sports, Activity, Humanitarian, and so forth. Each of these may be further subdivided as deemed necessary by system 101. As noted previously, each user may create in module 205 a user specific "space". If application 201 fails to provide an adequate categorical field for the user, such user may elect to create their own space/field to display their media posts. It is considered that a user may elect to not assign a categorical designation for a post, in which case the post may be automatically assigned by system 101 or allotted to a general categorical field for display. System 101 may automatically pull from detected imagery or text to self-classify a digital content media post.

With each digital media post is a displayed point value 223 assigned by the posting user. This is visible to all users. A processor of system 101 is configured to sort and allocate the placement of each post according to its assigned point value. When posting digital media, the user selects the type of media to share (step 215). The user also selects their desired categorical field for sharing (step 217) and the location in the media feed. The user then assigns or allocates the necessary point value to correspond to such a location (step 219). At such time, that point value is automatically removed from the user's accumulated point total (step 221). The assigned point value acts as the fee to place the post in that location of the media feed. System 101 is configured to automatically allocate the placement of the digital content media automatically in relation to a defined point value. Each digital content media is assigned a point value by the posting user and is automatically ranked in accordance with the assigned point value. System 101 is configured to systematically update the media feed to reflect new and modified point values.

It is understood that system 101 may be configured to periodically remove old media posts or automatically adjust assigned point values to enable the free flow of new posts throughout the media feed. For example, system 101 may reset posts after a particular time period to allow different posts a chance to be displayed. This can help ensure that a media feed does not get stagnant with limited content. Additionally, system 101 may be configured to permit a user to modify the assigned value of prior posts in order to modify placement over time. For example, if a user makes a media post using 100 points and is found in the top spot on Monday but subsequently falls to spot 30 on Thursday, the user could add points to the original 100 he/she used to adjust the location of the post to a higher position. If the new top spot was now 200, the user may only need to add another 101 points to retake the top spot. This feature may help users climb the media feed over time where initially they did not have sufficient points to allow the desired placement.

Figure 7:
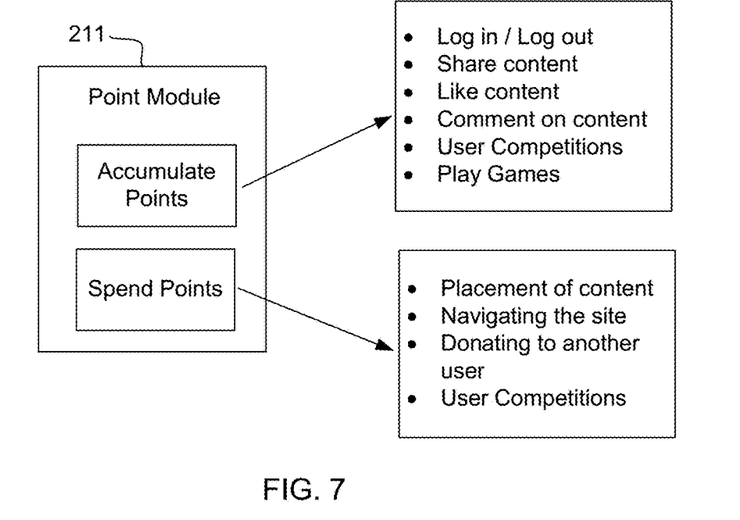
FIG. 7 is a chart of a point module in the system of FIG. 1.

Referring now also to FIG. 7 in the drawings, a view of point module 211 is illustrated. Point module 211 is configured to track and account for all points spent, given, and accumulated by a user. Each user has an accumulated point total. Module 211 permits users the ability to spend and acquire more points. Points are acquired by interacting and engaging with users, media posts, and in general, application 201. Exemplary methods that may be used to gain points are: logging into or out of application 201, sharing content on a media feed, commenting or liking content provided by others, user competitions, and the playing of games. It is understood that reference to games may not need to refer to complex games. It could refer to quizzes, surveys, basic interactive programs, and so forth.

As already alluded to, points may be spent in different ways as well. It was noted that accessing particular user spaces may necessitate points to view content inside. Additionally, system 101 may require points to view, share, or perform any functions, content, or features. For example, a user may incur a loss of points to view each categorical media feed. Other examples may include placing content in a particular location on a media feed, navigating the application, donating points to another user, and user competitions. System 101 is configured to automatically regulate the allocation and distribution of points for the user.

Figure 8:
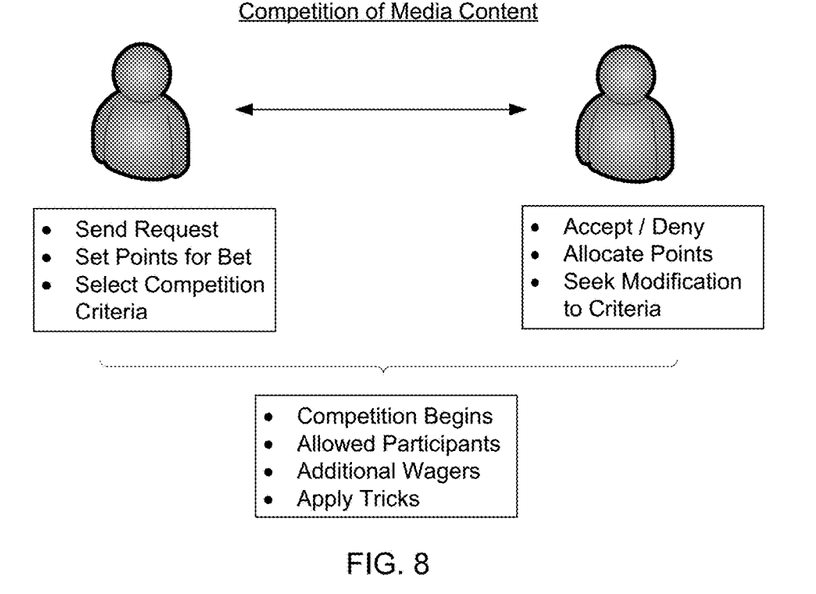
FIG. 8 is an exemplary chart of a competition between users using a performance tracking module in the system of FIG. 1.

Referring now also to FIG. 8 in the drawings, a chart illustrating the method of wagering points for competing media posts is provided. System 101 is configured to track the performance of digital content media within performance tracking module 209. Module 209 is engaged by one or more users at their own discretion. As seen in step 312 of FIG. 5, the method includes system 101 linking the displayed digital content media of the users. Users may be invited to participate from other users or may even be selected by system 101. System 101 can make such a determination when analyzing selected factors related to user interests, types of user posts, point totals of a user, activity level, and so forth. For example, a system 101 may identify two users having similar posting activity within the same categorical fields. The system may suggest a competition via module 209 to each user. This feature is useful to help engage users and promote activity in the site and shared content within the application.

Module 209 is configured to store a wagered point value and the selected performance criteria. Performance criteria relates to a level of interest to be garnered in a particular media post or posts. Examples of how this interest can be shown include at least the following: the amount of "likes", amount of times a post was viewed, the number of comments, number of times the media post was shared, and in general how many users the media content reached. The criteria may also include a set time duration for the competition as well. The users may select the media posts to be included in the competition.

In general, participating users put up a designated amount of points to play. The winner of the competition is determined in accordance with the performance criteria, automatically by system 101. System 101 then automatically allocates the wagered point value to the appropriate user. Module 209 compares the performance of the digital content media between the plurality of users throughout the competition. Module 209 may also provide updates to each user on the progress of the competition.

As illustrated in FIG. 8, a competition follows a typical pattern. It is understood that this is not the only manner in which a competition is performed, but serves as an example of one such method. Steps 312, 317, and 319 of FIG. 5 are instructive for seeing how the method of system 101 operates with multiple users. User 105a has elected to try and earn more points through a competition via module 209. Through module 209, user 105a sends a request to user 105b to engage in the competition. User 105a can set the point value to wager and the performance criteria. User 105b may accept or deny the competition. If user 105b accepts, user 105b may agree to the terms provided by user 105a or seek to modify the criteria. At this time the users may communicate and identify the particular media posts that will be involved in the competition. Once identified, the system links them together for purposes of the competition only. The users should ideally wager the same amount of points, but it is not necessary.

Once the terms of the competition have been agreed to by both users, the competition automatically begins. After the competition begins, selected functions may be possible. These functions may be used to manipulate the outcome or adjust the criteria of the competition. With respect to wagers, users may optionally increase their own wagers. Another option is for participants to apply "tricks" in an effort to manipulate the eventual outcome, or at least to give an advantage to one participant over another in the competition. These tricks are used to give one's self an advantage by either affecting their performance in a positive manner or by affecting the performance of one or more other participants in a negative manner. For example, one trick may be the automatic boosting of obtained "likes" on a user's post or the diminishing of another's "likes". Typically the tricks directly affect the performance of digital media content in the competition, but may also manipulate performance criteria itself, either positively or negatively. It may be useful to limit the number of times a "trick" may be used (i.e. 3 times and no more than 1x/week) or its overall life expectancy (i.e. 2 weeks). Tricks may be won, earned, unlocked with points, or gifted by users. Once the competition is completed, system 101 awards the point value of the losing user to the winner user.

The participating users may be acquainted with one another or may be randomly selected by either user. System 101 is optionally configured to restrict $3^{rd}$ party participants in these competitions. For example, system 101 may restrict the viewing and participation of the media posts to a selected "room" (see FIG. 6) as opposed to allowing it for general viewing by the public. Users may elect to modify the level of public viewing of the competition. It is understood that a single user may elect to wager against system 101 itself in selected situations. Users may select standard criteria generated by system 101 or propose custom terms which may then be reviewed prior to acceptance. System 101 can automatically propose custom single-user competitions based upon specific user factors, such as: interest, point totals, activity level, types of posts, personal data, and so forth. Steps 313 and 315 of FIG. 5 are instructive to understanding the method of system 101 when used in a single player situation. A main difference is that the media posts between multiple users are not linked together.

The current application has many advantages over the prior art including at least the following: (1) ability of a user to use their social media influence to effect the location of media posts to the media feed (2) allocating of point values to media posts; (3) use of a point system to promote interaction and engagement within the system; and (4) social media competitions between users; (5) public URL integrations from other social media networks; and (6) ability of a user to create their own space or room unique to them.

The particular embodiments disclosed above are illustrative only and are not intended to be exhaustive or to limit the invention to the precise form disclosed, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A computer-implemented method of regulating the display of digital content media in a social media platform, the method comprising:

processing digital content media via one or more processors, the processors in communication with an input/ output interface and a database, each item of digital content media being associated with a particular user, the database configured to store data related to each user;

displaying the digital content media within a media feed through the input/output interface in accordance to the preferences of each user, the digital content media being associated with one or more users;

receiving and processing command data from a particular user;

ranking the placement of the digital content media automatically in relation to a defined point value, each digital content media being assigned a point value by a user that posts the digital content media to the media feed, wherein the digital content media is automatically ranked in accordance with the assigned point value;

automatically adjusting the assigned point values of the digital content media to prevent the stagnation of digital media content within the media feed;

updating the media feed to reflect new and modified point values; and analyzing the activity and details of each user through a performance tracking module to coordinate a competition of digital media content between a plurality of users, the performance tracking module providing an invitation to participate to one or more users, the users being selected from a number of factors including at least one of activity level, point totals, and types of user posts.

2. The method of claim 1, wherein the processor sorts the location of the digital content media within the media feed in accordance with the assigned point value.

3. The method of claim 1, wherein each particular user has an accumulated point total.

4. The method of claim 3, further comprising:
automatically regulating the allocation and distribution of points for the particular user, the point total being stored in the database.

5. The method of claim 1, further comprising:
tracking the performance of digital content media within the performance tracking module, the performance tracking module configured to store a wagered point value related to performance criteria.

6. The method of claim 5, wherein the performance criteria is determined by the particular user.

7. The method of claim 5, wherein the particular user determines the wagered point value.

8. The method of claim 5, further comprising:
allocating the wagered point value in accordance with the performance criteria.

9. The method of claim 1, further comprising:
linking the displayed digital content media of the particular user to a secondary user within the performance tracking module, the performance tracking module configured to compare the performance of the digital content media between the plurality of users.

10. The method of claim 9, wherein the performance tracking module receives command data from the plurality of users to determine performance criteria.

11. The method of claim 9, further comprising:
allocating a wagered point value between the plurality of users in accordance with the performance criteria.

12. A method of interacting with digital media content in a social media platform, the method comprising:
entering the social media platform via an electronic portal, the electronic portal configured to verify the identity of an individual;

viewing digital content media of the social media platform through an input/output interface, the digital content media being viewed through a media feed;

posting fresh digital content media in real time on the social media platform;

ranking a point value to the fresh digital content media so as to select the location of the digital content media within the media feed;

automatically adjusting the assigned point values of the digital content media to prevent the stagnation of digital content media within the media feed; and coordinating a competition between digital media provided by different users; the competition being instigated by the social media platform, the social media platform analyzing the activity of a plurality of users and isolating users with similar posting activity to engage in a wagered competition of the digital media content, the social media platform providing an invitation to participate between identified users.

13. The method of claim 12, further comprising:
accumulating a quantity of points via a point module.

14. The method of claim 13, wherein points may be obtained through interacting with other users through the social media platform.

15. The method of claim 13, wherein points may be lost through interacting with other users through the social media platform.

16. The method of claim 13, wherein a value of points is assigned for the right of the user to view particular digital content media of another user.

17. The method of claim 12, further comprising:
setting a wagered amount of point value for each user.

18. The method of claim 12, further comprising:
establishing a performance criteria used to determine the winner of the wagered point value.

19. The method of claim 12, further comprising:
wagering a selected point value toward anticipated performance of the digital content media on the social networking platform, the digital content media is compared to performance criteria.

* * * * *